United States Patent [19]

Noguchi et al.

[11] Patent Number: 4,858,733
[45] Date of Patent: Aug. 22, 1989

[54] ELECTROVISCOUS LIQUID-FILLED SUSPENSION DEVICE AND CONTROL DAMPING DEVICE THEREFOR

[75] Inventors: Takeshi Noguchi; Takashi Kikuchi, both of Yokohama; Kazuya Takano, Kamakura, all of Japan

[73] Assignee: Bridgestone Corporation, Tokyo, Japan

[21] Appl. No.: 138,114

[22] Filed: Dec. 28, 1987

[30] Foreign Application Priority Data

Dec. 29, 1986 [JP] Japan ............................. 61-313069
Apr. 18, 1987 [JP] Japan ............................. 62-94290

[51] Int. Cl.⁴ .................... F16F 15/03; F16F 9/08; F16F 5/00
[52] U.S. Cl. ................................. 188/267; 188/298; 267/64.26; 267/64.23
[58] Field of Search ............. 267/64.13, 64.19, 64.21, 267/64.23, 64.24, 64.26, 64.27, 113, 35, 64.15; 280/707, 708; 188/268, 269, 298, 322.5, 267; 92/90, 93

[56] References Cited

U.S. PATENT DOCUMENTS

| | | | |
|---|---|---|---|
| 3,658,314 | 4/1972 | Luzsicza | 267/64.23 X |
| 3,955,807 | 5/1976 | Takamashi et al. | 267/64.23 |
| 4,416,445 | 11/1983 | Coad | 267/35 |
| 4,668,417 | 5/1987 | Gossens et al. | 252/74 X |
| 4,733,758 | 3/1988 | Duclos et al. | 188/267 |

FOREIGN PATENT DOCUMENTS

| | | |
|---|---|---|
| 3330205 | 3/1983 | Fed. Rep. of Germany . |
| 1282568 | 7/1972 | United Kingdom . |
| 2111171 | 6/1983 | United Kingdom . |
| 2122718 | 1/1984 | United Kingdom ............ 267/35 |

Primary Examiner—Robert J. Oberleitner
Attorney, Agent, or Firm—Sughrue, Mion, Zinn, Macpeak & Seas

[57] ABSTRACT

A liquid-filled suspension device having an inner cylinder, an outer cylinder, and an elastic member connecting these cylinders to each other. A connecting member is arranged on the cylinder, a closed liquid chamber formed inside at least one of the inner and outer cylinders, a restricted passage formed in the middle portion of the closed liquid chamber, and a flexible membrane member arranged in the closed liquid chamber. An electroviscous liquid is filled in the closed liquid chamber, and two electrode plates arranged in the restricted passage. In this suspension device is used a control device having sensors arranged on these cylinders, and arithmetic decision logic operated by signals from these sensors, and a high-voltage generating circuit operated by signal from the arithmetic decision logic.

4 Claims, 12 Drawing Sheets

FIG_1a
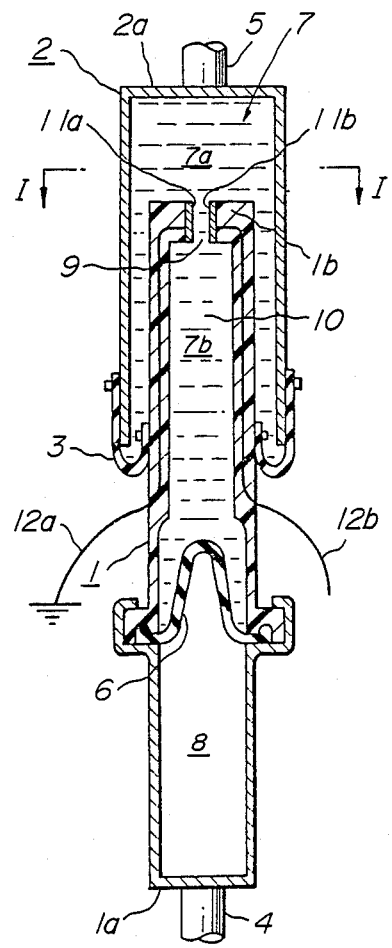
FIG_1b
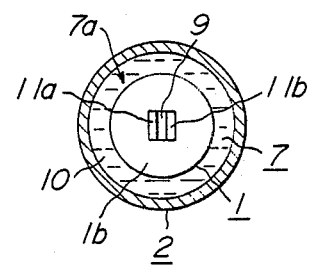

FIG_2
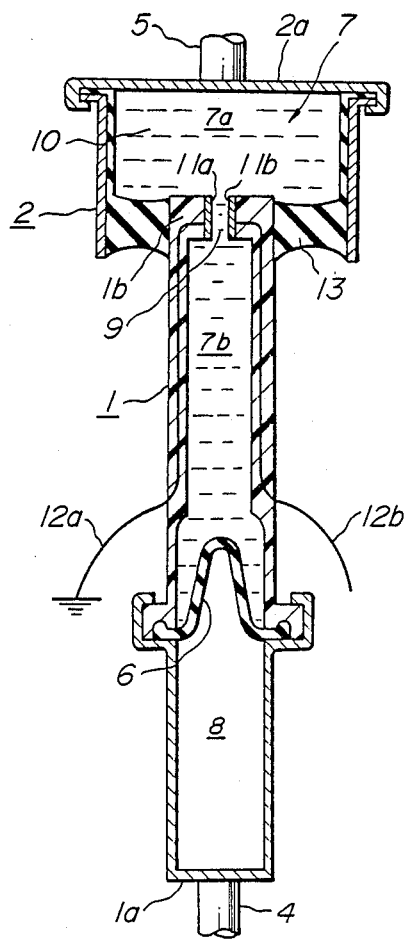

FIG_3
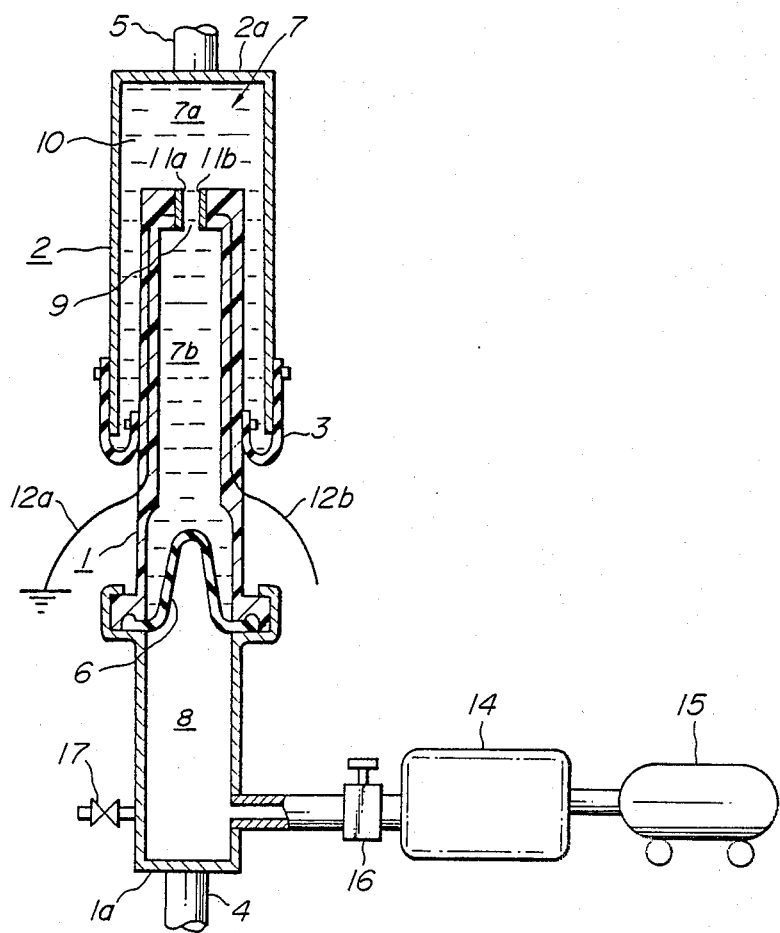

FIG_7
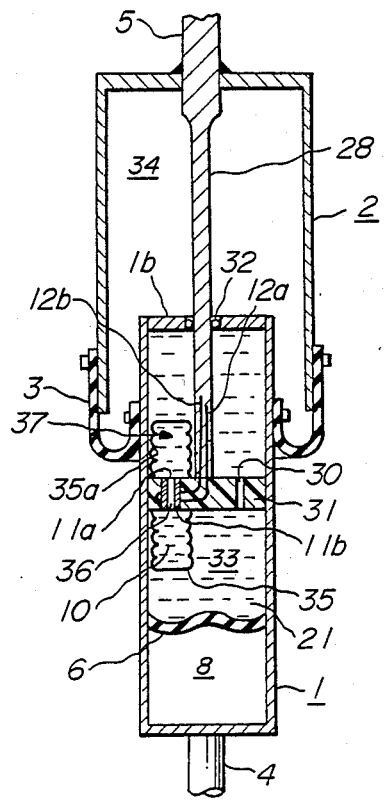

FIG_8
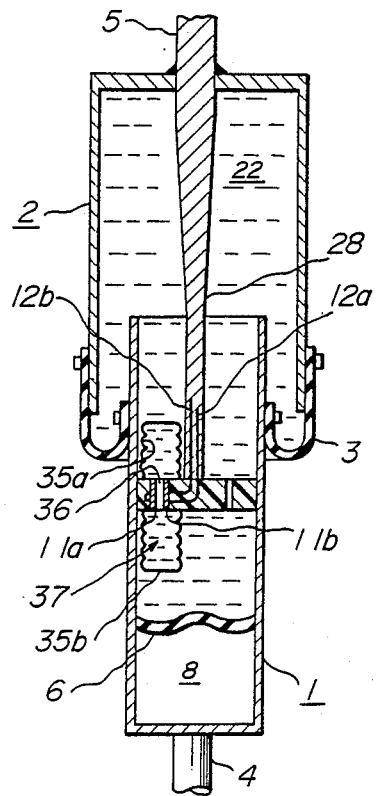

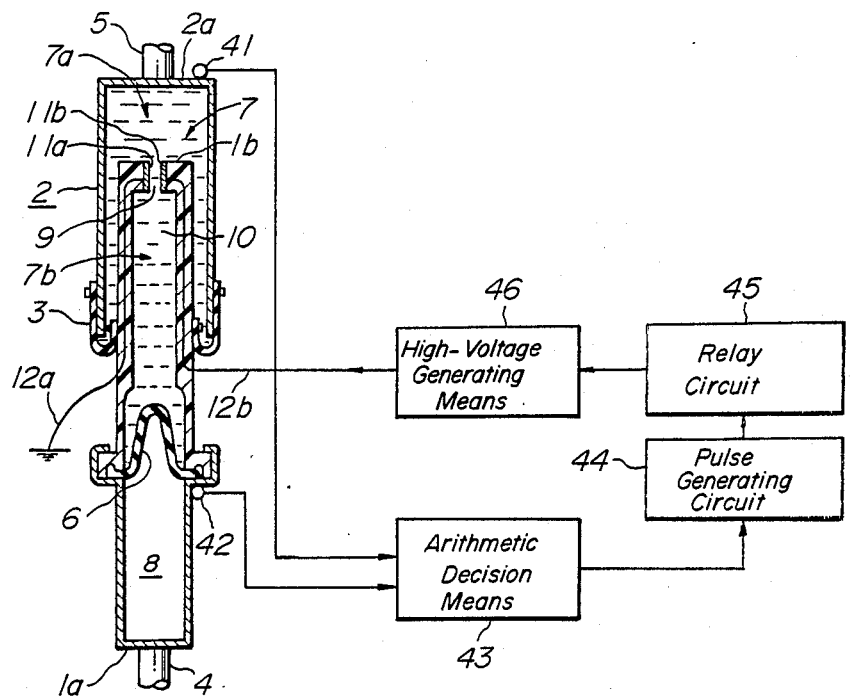
FIG_9

FIG._10a
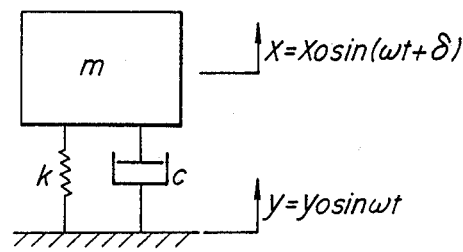
FIG._10b
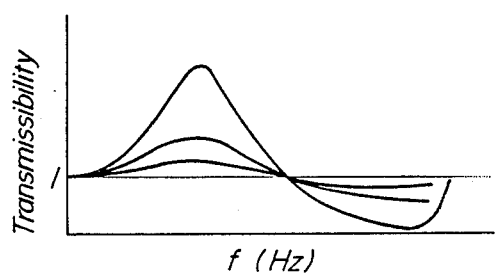

FIG_11a
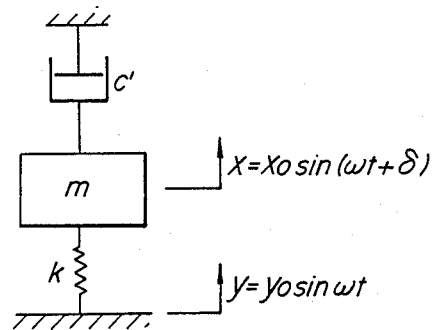
FIG_11b
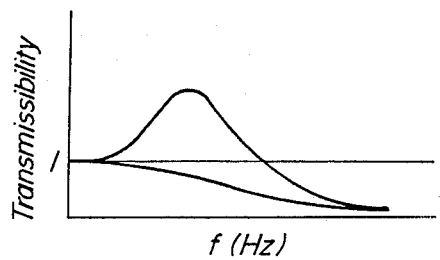

FIG_12
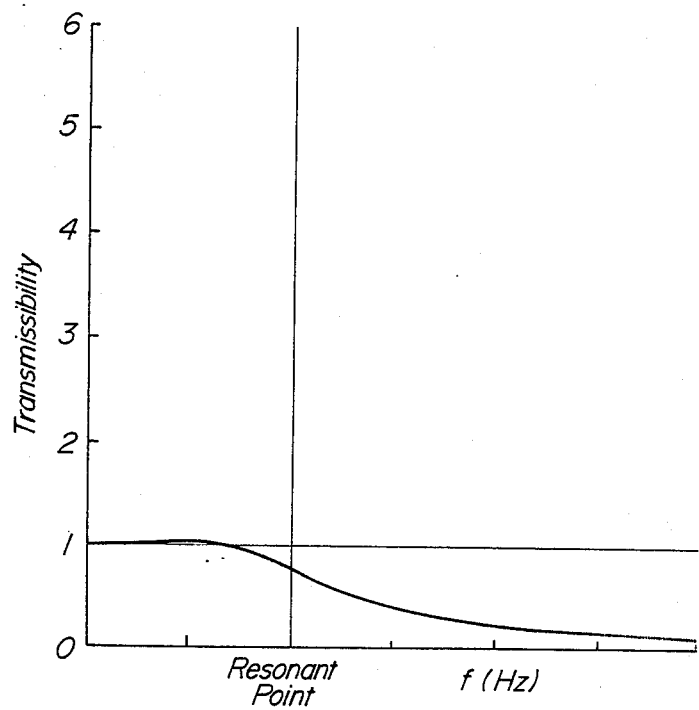

ELECTROVISCOUS LIQUID-FILLED SUSPENSION DEVICE AND CONTROL DAMPING DEVICE THEREFOR

BACKGROUND OF THE INVENTION

1. Field of the Invention

This invention relates to a liquid filled suspension device which may properly change vibration damping characteristics and suspension characteristics, if necessary, as well as a control device for operating the liquid filled suspension device so as to selectively vary the vibration damping characteristics of the suspension device in accordance with the actual vibration conditions thereof. Such devices are applied to a suspension means for automobiles, a suspension means for automobile seats, a railway vehicle suspension means, an insulator means for machine tools, an insulator means for industrial machines and the like as well as an apparatus for the manufacture of integrated circuit (IC) and so on avoiding minute oscillations, and an insulator frame for precision apparatuses such as optical equipment and strain gauges and pumps.

As a matter of course, the liquid-filled suspension device may be applied alone or used together with a spring means such as coil spring, air spring or the like.

2. Related Art Statement

The conventionally known liquid-filled suspension device, for example, applied to automobiles is frequently provided with a shock absorber and a coil spring arranged therearound.

In this device, the shock absorber sealed with oil acts to damp vibrations, while the coil spring acts to support vehicle weight. In general, the vibration damping force is determined by a size of a connecting hole formed in a piston of the shock absorber, so that the size of the connecting hole is made small in case of requiring a large vibration damping force. Conversely, the size of the connecting hole is made relatively large when a large vibration damping force is not so required.

In order to sufficiently and effectively match the single suspension device against various vibration frequencies and amplitudes, however, it is required to properly change the vibration damping force of the shock absorber in accordance with the values of vibration frequency and amplitude. Lately, there are proposed some methods, wherein the size of the connecting hole formed in the piston is adjusted to a predetermined value by operating a slide plate driven by a motor or the like included in a piston rod, some of which have been put into practice.

However, in such conventional techniques, a mechanism for driving the slide plate is required to adjust the size f the connecting hole, so that there are many problems that the structure of the device becomes complicated, the size of the device is large, the weight of the device is heavy and the cost of the device is high.

In addition, the conventional device can not provide vibration damping characteristics followed to rapid change of vibration condition. Furthermore, even if the vibration damping force is properly controlled by changing the size of the connecting hole, there is naturally a limitation in the damping performance of the device. As a result, there is a problem that a peak having a vibration transmissibility of more than 1 is always produced in a resonance point of the vibration system and such a transmissibility can not sufficiently be reduced at a high frequency region.

SUMMARY OF THE INVENTION

It is an object of the invention to solve the aforementioned problems and to provide a liquid-filled suspension device which can develop the expected vibration damping performance by utilizing an electroviscous liquid, whose viscosity being changed in response to the magnitude of the voltage applied, and having a simple structure, a small size, a light weight and a low cost. Further, it is another object of the invention to provide a control device for operating a liquid-filled suspension device which can sufficiently follow the vibration damping characteristics in response to a rapid change of vibration condition and can limit the vibration transmissibility to not more than 1 over substantially a whole of all frequency region and can develop excellent vibration damping performance even at high frequency region.

In the liquid-filled suspension device according to a first aspect of the invention, an inner cylinder and an outer cylinder are telescopically arranged and connected to each other through an elastic member, each of which cylinders is provided with a connecting member for connecting the device to a vibration system. A closed liquid chamber is formed inside at least one of the inner and outer cylinders and communicated to the other inside of the remaining cylinder, while a restricted passage is formed in the middle portion of the closed liquid chamber. At least a part of the closed liquid chamber is defined by a flexible membrane member and an electroviscous liquid is filled in the closed liquid chamber. Furthermore, two electrode plates are arranged in the restricted passage so as to separate away from each other at opposite positions and contact with the electroviscous liquid. Alternatively, the closed liquid chamber is formed by a flexible membrane member inside at least one of the inner and outer cylinders and the restricted passage is formed in the middle portion of the closed liquid chamber. Further, the electroviscous liquid is filled in the closed liquid chamber and the two electrode plates are attached to the restricted passage in the same manner as described above.

The electroviscous liquid is known from U.S. Pat. Nos. 2,886,151 and 3,047,057 and composed mainly of a water-repellent and non-conductive basic liquid, a strongly hydratable fine solid and water. This electroviscous liquid behaviors as a Newtonian liquid under no voltage state, but when the voltage is applied, the liquid transfers to Bingham material and finally to solid as the voltage value increases.

According to a second aspect of the invention, there is the provision of a control device for liquid-filled suspension device comprising sensors attached to the inner and outer cylinders in the liquid-filled suspension device so as to detect displacement, speed and acceleration speed of these cylinders, an arithmetic decision means for calculating a relative speed of vibration output member to a speed of vibration input member in the suspension device based on signals from these sensors and judging whether or not the calculated result is the same sign as the speed of the vibration output member, and a high voltage generating means for selectively changing a value of voltage applied to the electrode plate into, for example, zero or a given value based on the judged signal input from the arithmetic decision means through, for example, a pulse generating circuit and a relay circuit.

BRIEF DESCRIPTION OF THE DRAWINGS

The invention will be described with reference to the accompanying drawings, wherein:

FIG. 1a is a section view of an embodiment of the liquid-filled suspension device according to the invention;

FIG. 1b is a cross section view taken along a line I—I;

FIGS. 2-8 are section views of other embodiments of the liquid-filled suspension device according to the invention, respectively;

FIG. 9 is a block diagram illustrating the control device for liquid-filled suspension device according to the invention;

FIGS. 10a and 11a are schematic views illustrating actual and ideal vibration systems, respectively;

FIGS. 10b and 11b are graphs showing transmissibility of each of the vibration systems of FIGS. 10a and 11a; and FIG. 12 is a graph showing transmissibility of the device of FIG. 9.

DESCRIPTION OF THE PREFERRED EMBODIMENTS

Figure 4:
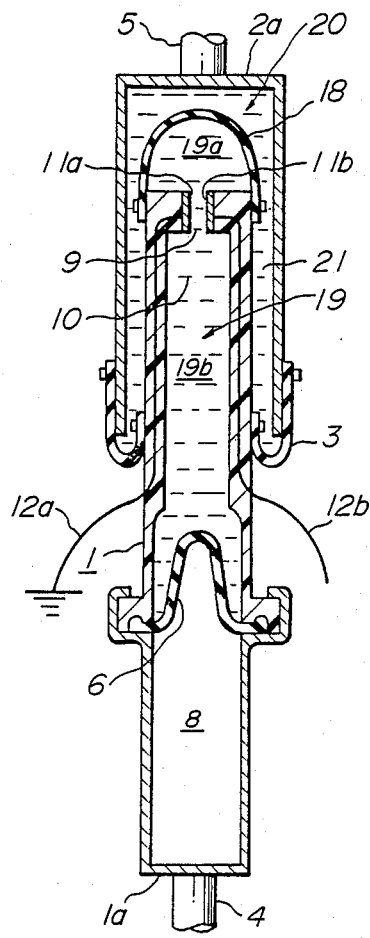

In the liquid-filled suspension device according to the invention, when the relative displacement of the outer cylinder to the inner cylinder is performed in the axial direction by transmitting vibrations to the device, if such vibrations are low frequency, large amplitude vibrations, they can be damped as expected by applying a voltage to the two electrode plates to increase the viscosity of the electroviscous liquid, while if the vibrations are high frequency, small amplitude vibrations, the application of the voltage is stopped to decrease the viscosity of the electroviscous liquid, whereby the dynamic spring factor of the device can effectively be reduced to sufficiently absorb the vibrations.

Thus, the expected vibration damping performances can be provided by such a simple structure that the electroviscous liquid is filled in the closed liquid chamber and the two electrode plates are arranged on the restricted passage disposed in the closed liquid chamber, and also the size and the weight of the device can sufficiently be reduced to realize the reduction of the cost in the device.

In the control device according to the invention, after the displacement, speed or acceleration speed of the outer and inner cylinders is detected by each of the sensors. The detected results are input into the arithmetic decision means, where the speeds of these cylinders may occasionally be calculated and the relative speed of the vibration output member to the speed of the vibration input member in the suspension device is calculated at the same time, whether or not the calculated result is the same sign as the speed of the vibration output member is judged by multiplication or division. Then, when these speeds are same sign or different sign, a pulse is generated from the pulse generating circuit to drive the relay circuit. The voltage generated from the high voltage generating means and applied to the electrode plate is selectively changed into given maximum value or minimum value based on ON.OFF signal generated from the relay circuit, whereby the viscosity of the electroviscous liquid is properly varied between the electrode plates, which can rapidly produce the adequate vibration damping characteristics of the liquid-filled suspension device and can completely remove the peak of transmissibility at the resonance point of the vibration system to render the transmissibility into not more than 1 over substantially a whole of all frequency region. Furthermore, the device can develop excellent damping performance at high frequency region with holding the high vibration damping force.

In FIG. 1 is sectionally shown a first embodiment of the liquid filled suspension device according to the invention, wherein numeral 1 is an inner cylinder, numeral 2 an outer cylinder coaxially and telescopically arranged with the inner cylinder 1, and numeral 3 a cylindrical elastic member connecting the inner cylinder 1 to the outer cylinder 2. In the illustrated embodiment, the cylindrical elastic member 3 is folded at its middle portion as a rolling lobe and connects the middle portion of the inner cylinder 1 to the lower end portion of the outer cylinder 2 at a liquid tight state. Moreover, the elastic member 3 is preferably provided with a reinforcing layer (not shown).

In this embodiment, a connecting rod 4 as a connecting member is protruded downward from a bottom wall 1a of the inner cylinder 1, while a connecting rod 5 as a connecting member is protruded upward from a top wall 2a of the outer cylinder 2.

Further, an elastic membrane 6 is liquid-tightly secured to the peripheral wall of the inner cylinder at its axial middle position, whereby the inside of the inner cylinder is divided into upper and lower portions. The closed liquid chamber 7 is defined above the elastic membrane 6 so as to be surrounded by the inner and outer cylinders 1 and 2. Therefore, the elastic membrane 6 as a flexible membrane member defines the lower end of the closed liquid chamber 7. On the other hand, a chamber 8 divided by the elastic membrane 6 and located there-beneath not only forms a closed chamber capable of filling with a gas such as air, inert gas or the like as shown in FIG. 1a, but also may be in air chamber connected to atmosphere.

The defined liquid chamber 7 is divided into an upper chamber 7a and a lower chamber 7b by a top wall 1b of the inner cylinder 1, while a small hole 9 serves as a connecting hole is formed in the top wall 1b to communicate the chamber 7a and 7b with each other.

Further, an electroviscous liquid 10 is filled in the closed liquid chamber 7. Moreover, two electrode plates 11a, 11b are secured to the side wall of the small hole 9 at opposed positions so as to separate away from each other and contact with the electroviscous liquid 10. The electrode plate 11a is connected to ground through a lead wire 12a, while the electrode plate 11b is connected to a high voltage generating means (not shown) through a lead wire 12b. Moreover, the lead wires are preferably fixed by embedding in the body portion of the inner cylinder 1, which may be made from of an insulative synthetic resin, as shown in FIG. 1a.

In the device of the above structure, when the connecting rod 5 is connected to a sprung member of an automobile and the other connecting rod 4 is connected to an unsprung member thereof, the vehicle weight is directly applied to the outer cylinder 2 to increase the electroviscous liquid 10 in both the upper chamber 7a and the lower chamber 7b, whereby the elastic membrane 6 is elastically deformed in a direction of reducing the volume of the chamber 8 and also the pressure of the gas filled in the chamber 8 is increased, so that the vehicle weight of the automobile is sufficiently supported by this device.

When vibrations are transmitted from the sprung or unsprung side to the device, the relative displacement between the inner and outer cylinders 1, 2 is produced in the axial direction. Thus the electroviscous liquid 10 in the upper and lower chambers 7a and 7b flows from one chamber to the other chamber through the small hole 9 under the deformed state of the elastic membrane 6, so that the vibrations are effectively damped by the flow resistance of the electroviscous liquid 10 passing through the small hole 9.

The vibration damping force of the above device is enhanced when the viscosity of the electroviscous liquid is increased by applying a voltage across the electrode plates 11a, 11b through the lead wires 12a, 12b, and becomes gradually larger as the applied voltage increases. Therefore, the voltage applied across the electrode plates 11a, 11b in the device is adjusted in accordance with the frequency and amplitude of vibration transmitted to the device, the loading state of the device and the like, whereby the expected vibration damping force can be obtained over a wide frequency region.

On the other hand, when vibrations transmitted to the device are a high frequency, small amplitude vibrations, the viscosity of the electroviscous liquid 10 is made to a minimum value, for example, by stopping the application of voltage across the electrode plates 11a, 11b, whereby the flowing resistance of the electroviscous liquid 10 is made minimum during the passing through the small hole 9, so that the dynamic spring factor of the device is advantageously reduced to sufficiently absorb the high frequency vibration. Moreover, two or more small holes 9 provided with the opposed electrode plates may be arranged besides the above illustrated embodiment. In the latter case, the optimum damping effect to the given frequency can be expected by applying the voltage to only a electrode pair arranged in one of the holes to increase the viscosity of the electroviscous liquid and holding the viscosity of the liquid possing through the other holes at original value, or by applying proper voltage to each of the plural electrode pairs.

FIG. 2 shows a modified embodiment of FIG. 1, wherein the elastic member connecting the inner and outer cylinders 1, 2 to each other is a flat ring-like elastic body 13 for connecting the upper end portion of the inner cylinder 1 to the lower and portion of the outer cylinder 2.

When the device of FIG. 2 is mounted to the automobile in the same manner as in FIG. 1, the same vibration damping performance as described above can be developed, and also the sufficiently small dynamic spring factor can be provided to high frequency, small amplitude vibrations.

When the device of FIG. 2 is mounted to the automobile in the same manner as in FIG. 1, the same vibration damping performance as described above can be developed, and also the sufficiently small dynamic spring factor can be provided to high frequency, small amplitude vibrations.

FIG. 3 shows a section view of another embodiment of the liquid-filled suspension device according to the invention. In this embodiment, the chamber 8 located beneath the elastic membrane 6 in the inner cylinder 2 as shown in FIG. 1 is connected to a compressor 15 through an auxiliary tank 14 and a gate valve 16 on one hand, and to an exhaust valve 17 on the other hand.

In this embodiment, for example, when the connecting rod 5 is connected to the sprung member and the connecting rod is connected to the unsprung member, the vehicle height of the automobile can be maintained at a given constant value irrespective of the loading value. This is done by supplying a pressure to the chamber 8 through the auxiliary tank 14 in accordance with the value of sprung loading or by discharging an extra pressure through the exhaust valve 17.

In other words, when the internal pressure of the chamber 8 reaches to a value capable of holding the weight of the sprung member at the mounted state of the device, the vehicle height can optionally be rendered into high or low level by supplying air from the auxiliary tank 14 to the chamber 8 to increase the air volume of the chamber 8 under the deformed state of the elastic membrane 6, or by discharging air through the exhaust valve 17 to decrease the air volume of the chamber 8.

Furthermore, the device shown in FIG. 3 can develop the same vibration damping performance and vibration insulating performance as in FIG. 1.

Moreover, the air pumping mechanism shown in FIG. 3 may be applied to the device of FIG. 2. According to circumstances, the auxiliary tank 14 can be omitted from the air pumping mechanism.

FIG. 4 shows another embodiment of the liquid-filled suspension device according to the invention, wherein an elastic membrane 18 is liquid-tightly secured to the top portion of the inner cylinder 1, whereby a closed liquid chamber 19 is defined among the elastic membrane 18, the elastic membrane 6 and the portion of the inner cylinder located above the elastic membrane 6 and filled with the electroviscous liquid 10. On the other hand, an outside chamber 20 is defined among the elastic membrane 18, the outer cylinder 2 and the cylindrical elastic member 3 and filled with an inexpensive oil 21 usually used other than the electroviscous liquid.

Thus, the volume of an upper chamber 19a located upward in the closed liquid chamber 19 can be considerably reduced as compared with the case of the aforementioned embodiments, so that the filling amount of the expensive electroviscous liquid can sufficiently be reduced.

According to this device, the damping of vibrations is performed by the flowing of the electroviscous liquid 10 between upper chamber 19a and lower chamber 19b located beneath the small hole 9 in the same manner as described in the above embodiments. Therefore, the vibration damping force is properly changed by regulating the value of voltage applied across the electrode plates 11a, 11b.

Figure 5:
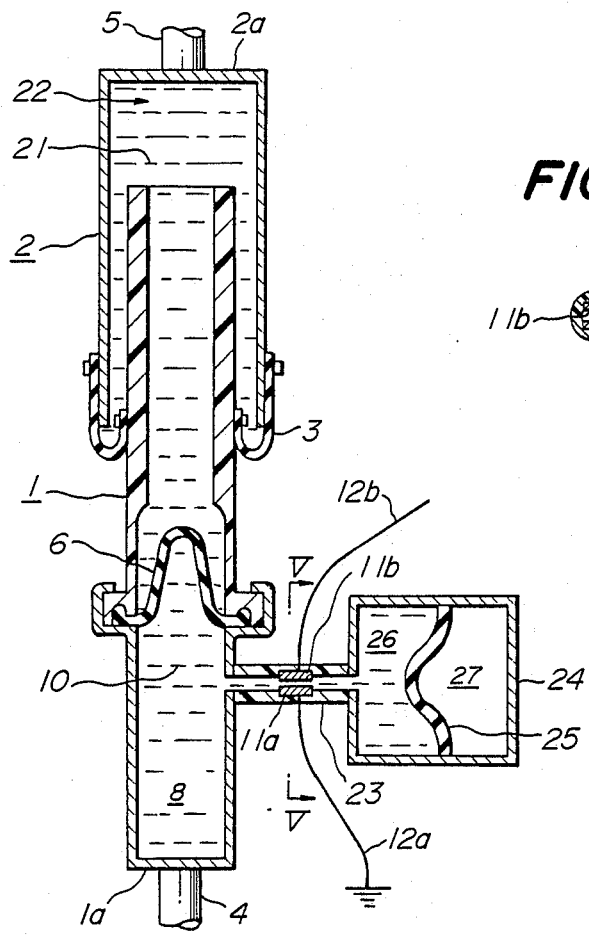

In an embodiment of FIG. 5, the top wall 1b of the inner cylinder 1 shown in FIG. 1 is omitted to form a closed chamber 22 located above the elastic member 6, which is filled with a commercially available inexpensive oil 21, while the chamber 8 formed in the inner cylinder 1 beneath the elastic member 6 is connected to an outside fluid chamber 24 through a restricted passage 23. The outside fluid chamber 24 is divided by another elastic membrane 25 into a liquid chamber 26 facing the chamber 8 and a gas chamber 27 separated away therefrom. A closed liquid chamber defined by the chamber 8, the liquid chamber 26 and the restricted passage 23 is filled with the electroviscous liquid 10, while two electrode plates 11a, 11b contacting with the electroviscous liquid 10 are arranged in the restricted passage 23.

According to this embodiment, not only the drawing of lead wires 12a, 12b connected to the electrode plates 11a, 11b can be easily be performed, but also the filling amount of the expensive electroviscous liquid 10 can sufficiently be reduced to make the device cost low.

When the outer and inner cylinders 1, 2 produces a relative displacement in axial direction at a mounted state of the device, the pressure acting to the elastic member 6 increases or decreases, and consequently the electroviscous liquid 10 flows between the chamber 8 and the liquid chamber 26 through the restricted passage 23 under the deformed state of the elastic membrane 25. Therefore, this device also performs the same vibration damping as in the aforementioned embodiments.

In this embodiment, the gas chamber 27 is filled with air, inert gas or the like, or may be communicated to exterior or connected to the air pumping mechanism.

Figure 6:
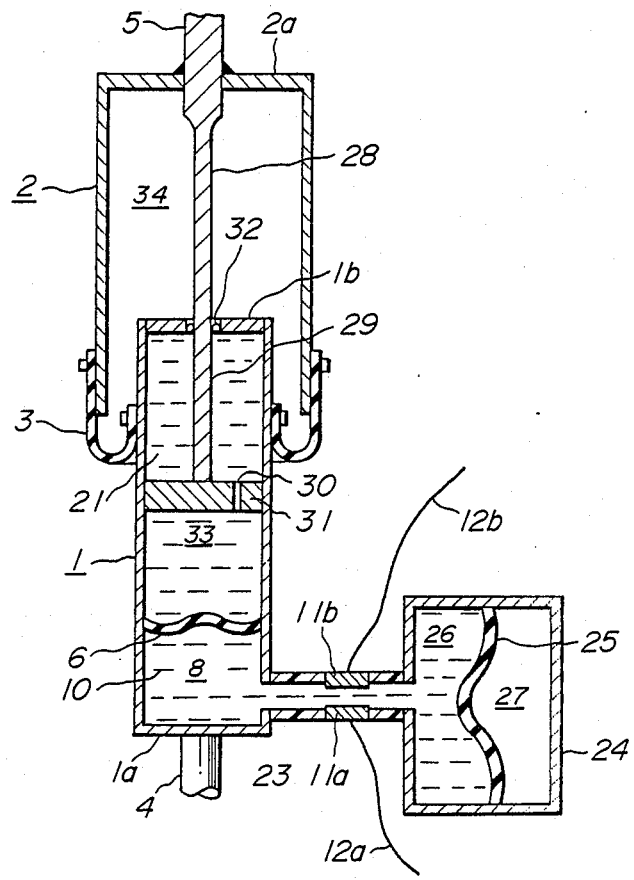

FIG. 6 illustrates sectionally a modified embodiment of FIG. 5. In this case, a rod-like member 28 is passed through a top wall 2a of the outer cylinder 2 and secured thereto. The portion of the rod-like member 28 protruding from the top wall 2a serves as a connecting rod 5, while the portion of the rod-like member 28 inserting into the inside of the inner cylinder 1 serves as a piston rod 29. The piston rod 29 is provided at its end with a piston 31 having one or more small holes 30 and slidably contacting with the inner cylinder 1. Furthermore, the elastic membrane 6 is located at the lower portion of the inner cylinder 1, while a seal ring 32 contacting with the piston rod 29 is arranged on the top wall of the inner cylinder 1, Thus a liquid-tightly upper chamber 33 is formed inside the inner cylinder 1 and filled with a commercially available cheap oil 21 and an inside chamber 34 is formed in the outer cylinder 2 and filled with a gas such as air, inert gas or the like. Moreover, it is preferable to connect the inside chamber 34 to a means for supplying and discharging air through an external tank.

When the relative displacement between inner and outer cylinders 1, 2 in axial direction is produced in the device of FIG. 6, the vibration damping is carried out by the flowing resistance of the electroviscous liquid 10 through the restricted passage 23 as well as the flowing resistance of the oil passing through the small hole 30 of the piston 31, so that the more effective vibration damping can be achieved as compared with those of the previous embodiments.

In this illustrated device, the relative displacement between inner and outer cylinders 1, 2 in a direction perpendicular to the axial direction can be prevented by the rod-like member 28, so that the damage of the cylindrical elastic member 3 can effectively be prevented.

FIG. 7 shows another embodiment of the invention. In this case, the chamber 8 shown in FIG. 6 is rendered into a closed chamber filled with a gas, while bag-like flexible membranes 35a, 35b are liquid-tightly attached to the upper and lower surfaces of the piston 31 in the upper chamber 33 filled with the oil 21 for the usual shock absorber inside the inner cylinder 1. The inner portions of the flexible membranes 35a, 35b communicate with each other through a restricted passage 36 formed in the piston 31 to form a closed liquid chamber 37, and further two electrode plates 11a, 11b are secured to the restricted passage 36. The electroviscous liquid 10 is filled in the closed liquid chamber 37.

In this illustrated device, the small hole 30 formed in the piston 31 is not an essential feature, but is particularly useful when the relative displacement between inner and outer cylinders 1, 2 is continued even after the electroviscous liquid 10 completely flows from one interior of the flexible membranes into the other, in other words, when the relative displacement between inner and outer cylinders is considerably large. Thus, the vibration damping can sufficiently be ensured by passing the oil 21 through the small hole 31 even after the completion of the flowing of the electroviscous liquid 10. For this end, the sectional area of the small hole 30 is favorable to be not larger than that of the restricted passage 36.

According to the device of FIG. 7, the filling amount of the electroviscous liquid 10 is made sufficiently small as compared with those of the previous embodiments, but the effective vibration damping can mainly be achieved by the flowing of such electroviscous liquid 10.

Since the portion located above the piston 31 in the upper chamber 33 of the inner cylinder 1 has a rigid structure, the internal pressure of this portion is extremely and sensitively increased or decreased on the 2 whereby the flowing of the electroviscous liquid 10 through the restricted passage 36 is carried out under a very sensitive stage, so that the responsibility and the damping force may advantageously be improved together.

For example, the same vibration damping function as in the device of FIG. 7 can be obtained when the piston rod 28 is passed upward from the lower wall of the inner cylinder 1 and protruded from the top wall 1b thereof into the inside of the outer cylinder 2 and the piston 31 having the same structure as in FIG. 7 is secured to the upper end of the piston 28 and slidably moved to the inner peripheral surface of the outer cylinder 2 and further a closed chamber filled with a gas is arranged in the upper portion of the outer cylinder 2.

FIG. 8 shows sectionally another modified embodiment of FIG. 7, wherein the top wall 1b of the inner cylinder 1 is omitted to form a closed chamber 22 above the elastic membrane 6. The closed chamber 22 is filled with the oil 21 for the shock absorber likewise the device of FIG. 5 except the closed liquid chamber 37 defined by the flexible elastic membranes 35a, 35b.

Then, the control device for the liquid-filled suspension device according to the invention will be described with reference to the accompanying drawings.

In FIG. 9 is shown a block diagram of a first embodiment of the control device for the liquid-filled suspension device according to the invention. In this case, the device of FIG. 1 is used as the liquid-filled suspension device, but the above control device may naturally be applied to the other suspension devices.

In this illustrated embodiment, the outer cylinder 2 is connected to the sprung member of the automobile as a vibration input member and the inner cylinder 1 is connected to the unsprung member as a vibration output member. Furthermore, a sensor 41 for detecting the displacement, speed and acceleration speed of the outer cylinder 2 and hence the sprung member is fixed to the top wall surface 2a. A sensor 42 is used for detecting the displacement, speed or acceleration speed of the inner cylinder 1 and hence the unsprung member is fixed to the side wall of the inner cylinder 1.

The sensors 41, 42 are connected to an arithmetic decision means 43, which is connected to a high-voltage generating means 46 capable of applying a voltage of several kV across the electrode plates 11a, 11b through a pulse generating circuit 44 and a relay circuit 45.

In the control device of the above structure, not only the speed $\dot{x}$ of the vibration output member, i.e. the outer cylinder 2 but also the speed $\dot{y}$ of the vibration input member, i.e. the inner cylinder 1 are calculated at the arithmetic decision means 43 based on signals from the sensors 41, 42. Moreover, when the signals input from the sensors 41, 42 into the arithmetic decision means 43 include speed signals, the above calculation is useless.

In the arithmetic decision means 43, the relative speed $(\dot{x}-\dot{y})$ of the outer cylinder speed $\dot{x}$ to the inner cylinder speed $\dot{y}$ is further calculated and then the calculated result, i.e. whether or not the sign of the relative speed $(\dot{x}-\dot{y})$ is the same as the outer cylinder speed $\dot{x}$ is judged, for example, by the multiplication $[\dot{x}.(\dot{x}-\dot{y})]$ or the division $[\dot{x}/(\dot{x}-\dot{y})]$. When the sign is only the same or different, the pulse generating signal is input from the arithmetic decision means 43 into the pulse generating circuit 44.

The reason why the aforementioned calculation and judgement are carried out by the arithmetic decision means 43 is as follows.

At first, considering the forced vibration in the actual vibration system with a single freedom degree as shown in FIG. 10a, when the displacement of mass m or vibration output side is $x = x_0 \sin(\omega t+\delta)$ and the displacement of base or vibration input side is $y = y_0 \sin(\omega t)$, the motional equation of this vibration system is represented as follows:

$$m\ddot{x}+c.(\dot{x}-\dot{y})+k.(x-y)=0 \qquad (1)$$

c: viscous damping factor
k: spring constant

Therefore, when the viscous damping factor c is varied, the transmissibility of vibration $(x_0/y_0)$ changes as shown in FIG. 10b.

As seen from the graph of FIG. 10b, in the vibration system of FIG. 10a, even when the viscous damping factor c becomes higher, the peak having a transmissibility of more than 1 is existent at the resonance point. Furthermore, the transmissibility increases with the increase of the viscous damping factor at high frequency region, in other words, the vibration insulating performance lowers.

On the other hand, in an imaginary vibration system as shown in FIG. 11a, when the displacements of the vibration output side and the vibration input side are $x=x_0\sin(\omega t+\delta)$ and $y=y_0\sin(\omega t)$, respectively, the motional equation of this vibration system is represented as follows:

$$m\ddot{x}+c'.\dot{x}+k.(x-y)=0 \qquad (2)$$

c': viscous damping factor

When the viscous damping factor is varied, the transmissibility of vibration changes as shown in FIG. 11b.

As seen from the graph of FIG. 11b, the vibration transmissibility is made smaller than 1 over a whole frequency region by making the viscous damping factor c' larger than the particular value $c_0$, and consequently the occurrence of peak having a transmissibility at a resonance point is sufficiently prevented and also the lowering of the vibration insulating performance at high frequency region is effectively prevented. Therefore, the imaginary vibration system is able to more effectively improve the vibration damping performances and vibration insulating performances as compared with the actual vibration system.

In order to approach the vibration damping performance and vibration insulating performance of the actual vibration system to those of the imaginary vibration system, therefore, it is necessary to control the viscous damping factor c of the actual vibration system so as to equalize both the motional equations or make the damping terms $c.(\dot{x}-\dot{y})$ and $c'.\dot{x}$ in the equations (1) and (2). For this purpose, the following condition should be satisfied:

$$c'.\dot{x}=c.(\dot{x}-\dot{y})$$

and hence $c' = c.(\dot{x}-\dot{y})/\dot{x} > c_0 \qquad (3)$

I the above equation (3), since the particular value $c_0$ of the viscous damping factor is always larger than zero, the followings are established:

$$c > \dot{x}/(\dot{x}-\dot{y}).c_0 \text{ when } (\dot{x}-\dot{y})/\dot{x} > 0 \qquad (4)$$

$$c < \dot{x}/(\dot{x}-\dot{y}).c_0 \text{ when } (\dot{x}-\dot{y})/\dot{x} < 0 \qquad (5)$$

thus, the arithmetic means 43 judges whether or not $(\dot{x}-\dot{y})/\dot{x}$ is larger than zero or the sign of $\dot{x}$ is the same as the sign of $\dot{x}-\dot{y}$ in order to properly use the above conditional equations. In case of the same sign, the arithmetic decision means 43 actuates the high-voltage generating means 46 through the pulse generating circuit 44 and relay circuit 45 so as to provide the viscous damping factor c as large as possible for satisfying the equation (4) as far as possible. On the other hand, when the sign of $\dot{x}$ is different from the sign of $\dot{x}-\dot{y}$, $\dot{x}/(\dot{x}-\dot{y})<0$, but $c<0$ because of $c_0>0$. However, the condition of $c<0$ is not actually reasonable, so that the arithmetic decision means 43 actuates the high-voltage generating means 46 so as to provide the realizable minimum viscous damping factor c.

In any case, the required viscous damping factor c can be properly regulated by selecting the size of the small hole 9, the properties of the electroviscous liquid, the voltage applied across the electrode plates 11a, 11b and the like.

When at least one of $\dot{x}$ and $\dot{x}-\dot{y}$ is zero in the equation (3), the value of the viscous damping factor c does not participate the result of the equation (3). In this case, the high-voltage generating means 46 takes either one of the above operations.

When the signal resulting from the same or different sign between $\dot{x}$ and $\dot{x}-\dot{y}$ is generated from the arithmetic decision means 43, the pulse is output from the pulse generating circuit 44 connected to the arithmetic decision means 43 into the relay circuit 45, from which ON signal for applying maximum voltage across the electrode plates 11a, 11b or OFF signal for minimizing the voltage applied across the electrode plates 11a, 11b are output into the high-voltage generating means 46.

When the sign of $\dot{x}$ is the same as the sign of $\dot{x}-\dot{y}$, the maximum voltage applied across the electrode plates 11a, 11b is usually several kV for providing the maximum viscous damping factor c, while when the sign between $\dot{x}$ and $\dot{x}-\dot{y}$ is different, the minimum voltage applied is zero or a neighborhood thereof for providing the minimum viscous damping factor c.

When the viscous damping factor c is controlled as mentioned above, the transmissibility of vibration is shown in FIG. 12. As seen from the graph of FIG. 12, the transmissibility is not more than 1 over substantially a whole frequency region and also is a value sufficiently smaller than 1 even at high frequency region. According to the invention, therefore, not only the damping properties of the vibration system can advantageously be improved, but also the occurrence of peak having a transmissibility at resonance point or the lowering of the vibration insulating performance can effectively be prevented and the lowering of the vibration insulating performance at high frequency region can sufficiently be prevented.

According to the control device of the invention, for example, considering the influences of the size of the restricted passage and the viscosity of the electroviscous liquid in the suspension device and the like, there is a case that when the voltage applied across the electrode plates 11a, 11b is made large, the damping force in the suspension device lowers, while when the voltage applied is made small, the damping force increases. In this case, ON, OFF signals input from the relay circuit 45 into the high-voltage generating means 46 are reversed to the aforementioned case, whereby the vibration damping properties can be improved.

Although the control device according to the invention has been described with reference to the illustrated embodiment, a time of several ten milliseconds is frequently required to increase the viscosity of the electroviscous liquid to a desired value after the application of voltage. Therefore, in order to correct the response delay of the electroviscous liquid, it is preferable to advance the timing of pulse generation output from the arithmetic decision means 43 from the actual vibration phase by a value corresponding to the response delay. This is achieved, for example, by interposing a phase adjusting means between each of the sensors 41, 42 and the arithmetic decision means 43.

As mentioned above, the invention can provide a liquid-filled suspension device having a simple structure, a small size, a light weight and a cheap cost. According to this suspension device, the expected vibration damping performances can be developed by changing the value of voltage applied to properly adjust the viscosity of the electroviscous liquid passing through the restricted passage, and also vibrations can effectively be absorbed by stopping the application of voltage to the electroviscous liquid to prevent the increase of dynamic spring factor to high frequency, small amplitude vibrations.

In the control device for the liquid-filled suspension device according to the invention, adequate vibration damping properties can rapidly be given to the suspension device, and the peak having vibration transmissibility at resonance point is completely removed to make the transmissibility to not more than 1 over substantially a whole frequency region, whereby the vibration insulating performances at high frequency region can be more improved.

What is claimed is:

1. A liquid-filled suspension device comprising; an inner cylinder having an insulative body portion, an outer cylinder telescopically arranged with said inner cylinder an elastomeric rolling lobe member connecting the cylinders to each other, a connecting member arranged on each of the said cylinders, a closed liquid chamber formed inside at least one of the inner and outer cylinders and communicating with the other inside of the remaining cylinder, a restricted passage formed in the middle portion of the closed liquid chamber, a flexible membrane member defining at least a part of the closed liquid chamber, an electroviscous liquid filled in the closed liquid chamber, two electrode plates arranged in said restricted passage which is formed on said insulative body portion separate form each other at opposite positions and being in contact with the electroviscous liquid and electrode lead wires embedded in said insulative body portion.

2. The device of claim 1 further comprising a gas compartment formed in said inner cylinder, said flexible membrane separating said gas compartment and said closed liquid chamber.

3. The device of claim 1 wherein said insulative body portion is made from an insulative synthetic resin.

4. A control device for a liquid filled suspension device comprising an inner cylinder having an insulative body portion an outer cylinder telescopically arranged with said inner cylinder, an elastic rolling lobe member connecting these cylinders to each other, a connecting member arranged on each of these cylinders, a closed liquid chamber formed inside at least one of the inner and outer cylinders and communicated to the other inside of the remaining cylinder, a restricted passage formed in the middle portion of the closed liquid chamber, a flexible membrane member defining at least a part of the closed liquid chamber, and electroviscous liquid filled in the closed liquid chamber, and two electrode plates arranged in said restricted passage on said insulative body portion separate from each other at opposite positions and in contact with the electroviscous liquid and electrode lead wires embedded in said insulative body portion; said control device comprising sensors attached to the inner and outer cylinders said inner cylinder defining a vibration output member and said outer cylinder defining a vibration input member, said sensors are attached on the liquid-filled suspension device so as to detect displacement, speed and acceleration speed of said cylinders, arithmetic decision means for calculating a relative speed of said vibration output member to a speed of said vibration input member in the suspension device based on signals from said sensors and judging whether or not a calculated result is the same sign as the speed of the vibration output member, and a high voltage generating means for selectively changing a value of a voltage applied to the electrode plates to a given value based on the judged signals input from the arithmetic decision means through a pulse generating circuit and a relay circuit.

* * * * *

UNITED STATES PATENT AND TRADEMARK OFFICE
CERTIFICATE OF CORRECTION

PATENT NO. : 4,858,733

DATED : August 22, 1989

INVENTOR(S) : Takeshi NOGUCHI et al.

It is certified that error appears in the above-identified patent and that said Letters Patent is hereby corrected as shown below:

IN THE SPECIFICATION:

Column 8, line 58, change "input" to --output--;
Column 8, line 59, change "output" to --input--.

IN THE CLAIMS:
Coloumn 12, line 43, after "cylinder" insert --,--
Column 12, line 43, change "inner" to --outer--;
Column 12, line 45, change "outer" to --inner--;

Signed and Sealed this

Seventeenth Day of July, 1990

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,858,733

DATED : Aug. 22, 1989

INVENTOR(S) : Takeshi Noguchi et al

It is certified that error appears in the above-identified patent and that said Letters Patent is hereby corrected as shown below:

Column 12, line 47, before "speed" insert --and one of-- and change "and" to --or--.

Signed and Sealed this

Twenty-third Day of April, 1991

Attest:

Attesting Officer

HARRY F. MANBECK, JR.

Commissioner of Patents and Trademarks